March 21, 1961  G. E. CARLSON  2,975,598
SEALING RING
Filed Dec. 17, 1956  2 Sheets-Sheet 1
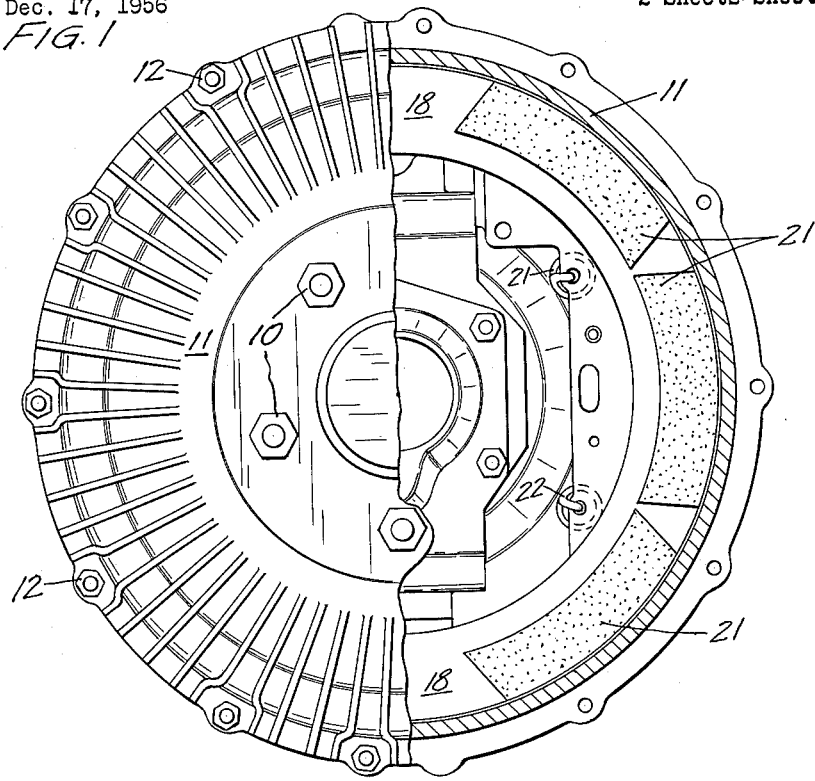
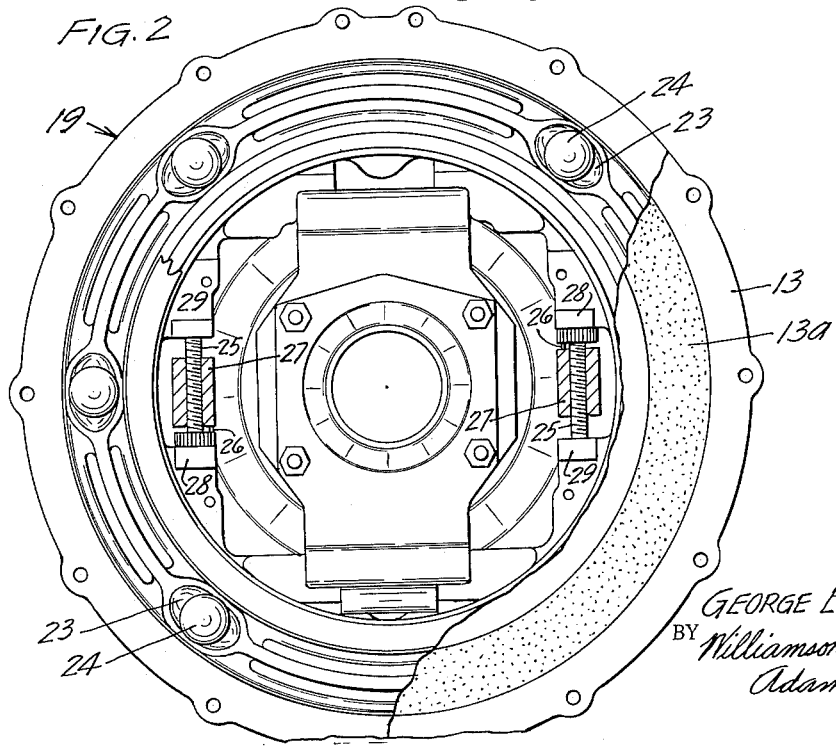
INVENTOR.
GEORGE E. CARLSON
BY Williamson, Schroeder,
Adams & Meyers
ATTORNEYS March 21, 1961     G. E. CARLSON     2,975,598
SEALING RING Filed Dec. 17, 1956     2 Sheets-Sheet 2

INVENTOR.
GEORGE E. CARLSON
BY
Williamson, Schroeder, Adams & Meyers
ATTORNEYS

United States Patent Office 2,975,598
Patented Mar. 21, 1961

2,975,598
SEALING RING

George E. Carlson, Minneapolis, Minn., assignor to A-P-D Co., Minneapolis, Minn., a corporation of Minnesota Filed Dec. 17, 1956, Ser. No. 628,588

5 Claims. (Cl. 60—54.6)

This invention relates to sealing rings. More particularly it relates to sealing rings for use in a groove or recess wherein the sealing ring is utilized for the purpose of converting fluid pressure into mechanical pressure as well as to preclude escape of the fluid from the groove.

Sealing rings are put to a wide variety of uses and because of the variance in the conditions under which they are utilized, a particular sealing ring may function extremely well under one set of conditions and yet be quite unsatisfactory under other conditions or when used to perform a different function. For example, one of the most common uses for a sealing ring is to prevent the escape of fluid between two parts of a machine or device which requires that one of the parts moves relative to the other. It has been found, however, that a sealing ring which will perform this function in a highly advantageous manner may be unsatisfactory for simultaneously converting fluid pressure into mechanical pressure and precluding the escape of fluid between the sealing ring and the groove or channel defining walls within which the sealing ring lies. To be more explicit, one needs only consider the use of sealing rings within the double disc type brake which quite recently is being used to an ever increasing extent on passenger automobiles and other automotive vehicles.

The effectiveness of the seal however, is not the only major consideration in arriving at a satisfactory sealing ring for such usages. Another consideration which is of primary importance is the ability of the sealing ring to withstand prolonged usage. In other words, the sealing ring must be so made that it will wear uniformly and moderately. Unless it does so, too frequent replacements will be required. Other considerations are cost, ease of installation and replacement, ease of manufacture in large quantities, uniformity achievable, etc.

In double disc type brakes of modern design, the two discs are actuated by the introduction of fluid pressure into an expanding mechanism disposed between the two discs so as to cause the latter to separate and bring their braking surfaces into engagement with the braking surfaces of a housing which surrounds them. The fluid under pressure is introduced into a groove or channel and beneath or behind an annular piston which lies within the groove. This piston necessarily has a loose fit and moves only a very short distance. Between the fluid and the piston and within the groove, there is disposed an annular sealing ring which must not only preclude the escape of the fluid under pressure but must also convert the fluid pressure into mechanical pressure and transmit the same to the opposed discs to cause them to move away from each other and into engagement with the braking surfaces of the housing. It is believed that it is resistance in the form of mechanical pressure offered by the disc which often causes the sealing ring to operate ineffectively whereas the same sealing ring may be highly effective and satisfactory when it is not called upon to transmit mechanical pressure. My invention is directed toward providing a sealing ring which will function very effectively despite the fact it must convert the fluid pressure into mechanical pressure and transmit it to other moving parts of a mechanism.

It is a general object of my invention to provide a novel and improved sealing ring of inexpensive and simple construction and operation.

A more specific object is to provide a novel and improved sealing ring which is capable of effectively functioning as a seal while converting fluid pressure into mechanical pressure and transmitting the same.

Another object is to provide a novel and improved sealing ring which can effectively function as a seal within a groove to convert fluid pressure into mechanical pressure and transmit the same to a flat surface without destroying its own seal.

Another object is to provide a novel and improved sealing ring of the class described which will wear uniformly and hence have a useful life span extending far beyond that of sealing rings heretofore known and utilized under the conditions specified.

Another object is to provide a novel and improved sealing ring of unique construction and design which is unusually well adapted for use in double disc type brakes to more effectively preclude the escape of fluid under pressure therefrom while converting fluid pressure to mechanical pressure and transmitting the same and which will wear uniformly at its sealing surfaces so as to have an extended useful life span beyond that heretofore possible.

Another object is to provide a novel and improved sealing ring of inexpensive and simple construction but of unique design in combination with a groove wherein the ring is called upon to convert fluid pressure to mechanical pressure and transmit the latter, the ring functioning to effect a more perfect seal while wearing to a lesser extent than has heretofore been possible.

These and other objects and advantages of my invention will more fully appear from the following description, made in connection with the accompanying drawings, wherein like reference characters refer to the same or similar parts throughout the several views, and in which:

Fig. 1 is an end elevational view of a double disc type brake assembly with portions of the housing broken away to show one of the actuating discs and the interior of the assembly;

Fig. 2 is an elevational view of the inner section of the housing of a double disc braking assembly taken along line 2—2 of Fig. 3 with the outer section of the housing and most of the outer actuating disc removed, portions of the inner actuating disc being broken away to show the annular braking surface on the interior of the inner housing;

Figure 4:
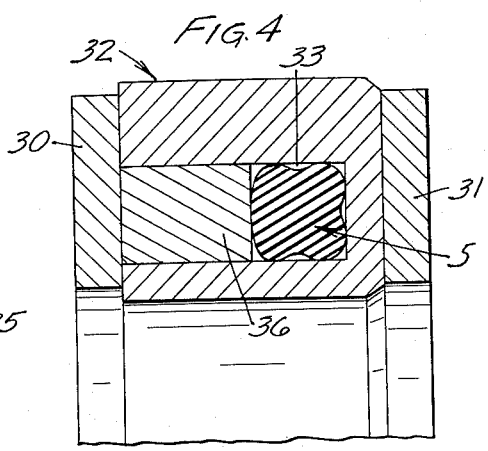
Figure 5:
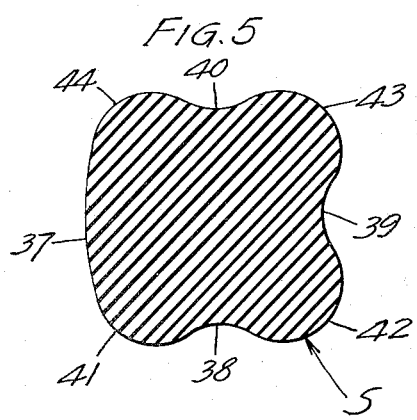

Fig. 4 is a cross sectional view on an enlarged scale of the actuating mechanism disposed between the actuating discs; and Fig. 5 is a cross sectional view on a still larger scale of the novel sealing ring which is utilized within the disc actuating mechanism to more effectively preclude the escape of fluid under pressure therefrom while converting the fluid pressure to mechanical pressure and transmitting the same.

One embodiment of my invention may include as shown in Figs. 1–5, a ring like member or sealing device indicated generally by the letter S and formed of flowable material such as natural rubber. The embodiment of the seal S which is shown is formed of rubber and hence is both compressible and resilient as well as flowable. By the term "flowable" I refer to the characteristic of portions of the body member shifting when subjected to pressure while the configuration of the member itself changes to compensate therefor. As shown, the ring member is an integrally formed seal comprised of such material and is of the same compressibility and resiliency throughout. Other materials suitable for use in the manufacture of these seals includes synthetic rubbers, plastics and other rubber-like materials having these characteristics.

Figure 3:
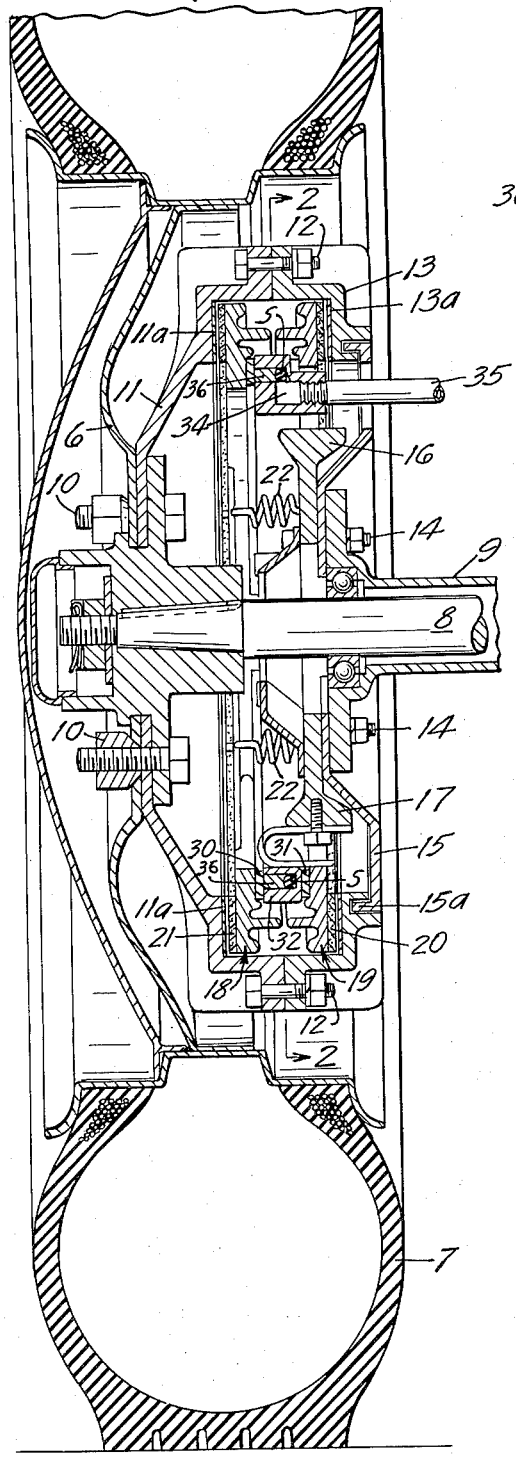
Fig. 3 is a vertical sectional view of a tire and wheel mounted on an axle and having one of the double disc type brake assemblies secured thereto and showing the interior of the braking assembly.

As best shown in Figs. 1–3, the ring S which is a salient part of my invention may be utilized to great advantage in conjunction with a double disc type braking assembly. When so used, the sealing ring S effectively precludes the escape of the fluid under pressure which is the prime mover of the braking surfaces. The sealing ring S, in addition to precluding the escape of fluid under pressure, also converts that pressure to mechanical pressure and transmits the same to cause the braking surfaces of the disc to bear against the braking surfaces of the housing and thereby accomplish the braking action. This can best be understood by reference to Fig. 3 wherein there is disclosed a wheel member 6 carrying a tire 7 and mounted upon an axle 8 which is provided with an axle housing 9. Secured to the wheel 6 by bolts 10 is an outer housing section 11. This housing section 11 in turn is fixedly secured by bolts 12 to an inner annular housing section 13, the central portion of which is relatively open. It is obvious, of course, that these housing sections 11 and 13 rotate with the wheel. These housing sections 11 and 13 have braking surfaces 11a and 13a on their inner surfaces. These braking surfaces 11a and 13a are annular in shape.

Secured to the axle housing 9 which constitutes part of the frame of the automotive vehicle (not shown) by bolts 14 is a mounting plate 15. This mounting plate 15 is the stationary element of the brake and absorbs all of the torque. Its flange 15a mates with a groove on the inner housing 13 to make the brakes splash-proof. This can best be seen by reference to Fig. 3. The central portion of the mounting plate is open to accommodate the axle 8. The mounting plate 15 carries a pair of outwardly extending lugs 16 and 17 which extend into recesses provided at the interior of the inner braking disc to preclude relative rotation. This can best be seen in Figs. 1 and 2.

Mounted within the housing sections 11 and 13 in opposed relation is a pair of braking discs indicated generally as 18 and 19. The inner braking disc 19 is provided with a plurality of braking strips 20 and the outer braking disc 18 is provided with a plurality of similar braking strips or segments 21. As best shown in Fig. 1, these braking strips 20 and 21 are arranged in an annular pattern and as shown in Fig. 3 are disposed directly opposite the braking surfaces 11a and 13a of the housing sections 11 and 13. These braking discs 18 and 19 are capable of axial movement toward and away from each other within the housing and are urged toward each other at all times by springs 22 which extend between the two discs as best shown in Fig. 3 and engage the same at their ends through openings provided for that purpose within the material forming the discs adjacent their inner peripheries. Each of the discs 18 and 19 is provided at its peripheral portions with oppositely arranged and oppositely facing concavely shaped ramps 23. These ramps may best be seen in Fig. 2. Disposed between the oppositely positioned ramps is a metal bearing member 24 which serves to space the discs 18 and 19 as required in accordance with the extent of wear on the braking segments 20 and 21. The discs 18 and 19 are capable of limited relative rotation and as they rotate, the bearing members 24 are forced to move up the ramps and thereby spread the discs 18 and 19 apart accordingly to compensate for the wear on the braking segments 20 and 21.

The extent of the separation of these discs is limited and controlled by an automatic adjuster screw 25 and ratchet 26. The screw 25 is carried within a boss 27. This automatic adjuster screw and ratchet is not a portion of the invention claimed herein and therefore it is deemed sufficient to merely state that it is regulated automatically by the pressure which is brought to bear upon the screw 25 by the lugs 28 and 29 between which the automatic adjuster screw is positioned. The boss 27 is mounted on the outer actuating disc 18 while the lugs 28 and 29 are carried by the inner actuating disc 19. As best shown in Fig. 2, a pair of these automatic adjuster screws and ratchets are provided at opposite sides of the assembly.

Disposed between the two actuating discs 18 and 19 and separated therefrom by a pair of split ring members 30 and 31 is a groove or channel defining structure indicated generally as 32. As shown in Fig. 4, the channel 33 extends axially of the discs 18 and 19. The channel member 32 is preferably formed of metal or other rigid material and is provided with a fluid pressure port 34 at the bottom of the channel which is adapted to be connected by means of a threaded connection to the hydraulic brake line 35 so that pressure upon the brake pedal (not shown) of the automobile may force hydraulic fluid under pressure into the bottom of the channel 33. Disposed within the channel 33 adjacent the mouth or open end thereof is an annular piston member 36 which is preferably formed of metal and tends to move outwardly of the groove upon the introduction of fluid under pressure at the bottom of the groove.

The split ring member 31 is formed of a material which offers a minimum of friction and which will transmit heat readily. The split ring member 30 is formed of similar material and lies across the open end of the channel 33 and the piston 36 lies contiguous thereto. Disposed within the channel 33 between the bottom thereof and the annular piston 36 is one of the sealing rings S having a design which causes the sealing ring to more effectively preclude the escape of fluid under pressure from the channel 33.

As can best be seen by reference to Fig. 5, the ring member S is of generally rectangular cross section and has one of its axial side surfaces slightly convex in configuration. This axial side surface 37 is substantially flat but extends outwardly to a slight extent for a reason to be described hereinafter. The inner diameter side surface 38, the other axial side surface 39, and the outer diameter side surface 40 are all preferably concave in shape while the corner portions 41, 42, 43, and 44 are convex in shape. It will be noted that the convex corner portions merge tangentially with the concave sides of the ring. Reference to Fig. 4 shows that the slightly convex side 37 bears against the annular piston member 36 while the axially spaced concave side 39 disposed oppositely thereto faces the bottom of the groove 33 and lies contiguous thereto. I have found that when a sealing ring is shaped in this manner, it distributes the wear on the ring uniformly and perfects a seal which is substantially more efficient than any heretofore known wherein the seal must perform the dual function of precluding the escape of fluid under pressure and at the same time converting that pressure to mechanical pressure and transmitting the same to another movable element.

I have found that when the sealing ring S is shaped as disclosed herein, a minimum of wear will take place upon the ring for the sealing function is distributed in a more uniform manner around the cross-sectional circumference of the ring. Since the degree of wear which takes place on a sealing ring while performing such a function is of primary importance, a ring of this design is highly desirable because it need not be replaced as frequently and it more effectively prevents the escape of fluid from the channel into which the fluid pressure is introduced for the purpose of actuating the braking discs.

It will be readily appreciated, of course, that the pressure applied by the sealing ring S to the annular piston member 36 is in turn transmitted to the braking disc 18 against which it bears with the result that the discs 18 and 19 are forced apart to provide the desired braking action.

I have found that a sealing ring designed like the sealing ring S perfects a much better seal than sealing rings heretofore known and used to avoid the escape of fluid under pressure while simultaneously converting fluid pressure to mechanical pressure and transmitting the same. I believe I achieve such improved results through the use of the substantially flat and preferably slightly convex side surface 37. Tests show that this type of seal gives improved results and I believe these results can be attributed to this configuration. I believe that the slightly convex side surface 37 is flattened or at least fails to yield when placed under compression with the result that the rubber cannot flow away from between the two corner portions 42 and 43 and hence the tendency for these two corner portions to pull away from the channel walls is eliminated and the seal is thus not broken at the points when these corner portions engage the channel walls.

It should be noted that the radial thickness of the sealing ring S is just sufficient that it fits snugly into the groove 33 under slight or no compression. The inner diameter of the ring S is equal to the inner diameter of the groove 33. There is no compression between the axial side surfaces upon installation and until fluid pressure is applied thereto.

In addition to the above advantages, my sealing rings S may be manufactured at low cost, they can be easily and quickly installed or replaced, they can be manufactured in large numbers while maintaining uniformity, they wear uniformly, and they have an extended useful life span.

The convex surface 37 of the sealing ring S shown in the drawings extends outwardly approximately .007 of one inch beyond a straight line extending between the curved corners 41 and 44. The radius of curvature of each of the corners or lobes 41, 42, 43 and 44 is one sixteenth of an inch. The overall dimensions of the ring in cross-section are .256–.260 inch taken both radially and axially. The depth of the groove 33 is such that the convex surface 37 just touches the ring 36 or is under very slight compression.

It will, of course, be understood that various changes may be made in the form, details, arrangement and proportions of the parts without departing from the scope of my invention which consists of the matter shown and described herein and set forth in the appended claims.

What is claimed is:

1. A sealing device comprising a continuously formed ring-like member made of a resilient flowable material throughout and adapted to be fitted into a sealing groove of ring-like configuration, said ring-like member being generally rectangular in cross-sectional configuration and having one substantially flat side and three concave sides and having a lobe at each of the corners between adjacent sides, the innermost portion of each of said concave sides being disposed at the central portion of the respective sides, the lobes formed at the corners of each of said sides extending outwardly of the central portion of the associated side a distance which is a very minor portion of the distance between the central portion of the associated side and the central portion of the opposite side to thereby define stubby relatively inflexible lobes, the exterior surface of said lobes in their free forms being smoothly contoured and continuously arcuate in shape whereby when mechanical pressure is evenly distributed against the flat side of said member while disposed within such a groove and fluid pressure is applied to the opposite concave side of said member, said member will provide an effective seal against leakage of the fluid past said member.

2. A sealing device comprising a continuously formed ring-like member made primarily of a resilient flowable material and adapted to be fitted into a sealing groove of ring-like configuration, said ring-like member being generally rectangular in cross-sectional configuration and having one side only slightly convex and having three concave sides and having a lobe at each of its corners between adjacent sides, the innermost portion of each of said concave sides being disposed at the central portion of the respective sides, the lobes formed at the corners of each of said sides extending outwardly of the central portion of the associated side a distance which is a very minor portion of the distance between the central portion of the associated side and the central portion of the opposite side to thereby define stubby relatively inflexible lobes, the exterior surface of said lobes in their free forms being smoothly contoured throughout and continuously arcuate in shape whereby when mechanical pressure is evenly distributed against the convex side of said member while disposed within such a groove and fluid pressure is applied to the opposite concave side of said member, the corners adjacent said last mentioned side will provide an effective seal against leakage of the fluid between said member and the walls of the groove into which it is fitted.

3. A sealing device comprising a continuously formed ring-like member made primarily of a resilient flowable material and adapted to be fitted into a sealing groove of ring-like configuration, said ring-like member in its free form being generally rectangular in cross-section and having a pair of axially spaced opposite sides, one of said sides being convex and the other of said sides being of dished-out configuration and having a lobe at each of its corners, the innermost portion of said dished-out side being disposed at the central portion of the side, the lobes formed at the corners of the dished-out side extending outwardly of the central portion of the dished-out side a distance which is a very minor portion of the distance between the central portion of the opposite convex side to thereby define stubby relatively inflexible lobes, the exterior surface of said lobes being arcuate and convex in shape and the exterior surface between said lobes being concave in shape throughout whereby when mechanical pressure is evenly distributed against the flat side of said member while disposed within such a groove and fluid pressure is applied to said opposite dished-out side of said member, the corners adjacent said last mentioned side will provide an effective seal against leakage of the fluid between said member and the walls of the groove into which it is fitted.

4. An assembly comprising, a cylinder member, a piston member mounted within said cylinder member and co-operatively defining therewith in a pressure chamber, said members being movable relative to each other, one of said members having a port for introducing fluid under pressure into said pressure chamber, one of said members having a substantially flat annular surface extending circumferentially of the axis of said piston member along its periphery and substantially normal to said axis, and a sealing ring mounted within said chamber between said flat annular surface and said port, said sealing ring having a pair of axially spaced sides, one of said sides being convex and bearing against said flat annular surface and the other of said sides being concave and smooth throughout its entire surface and being disposed between said port and the remainder of said sealing ring, said sealing ring being generally rectangular in cross-sectional configuration and having a convexly shaped lobe at each of the corners thereof between adjacent sides, the innermost portion of said concave side being disposed at the central portion of the side, the lobes formed at the corners of the concave side extending outwardly of the central portion of the concave side a distance which is a very minor portion of the distance between the central portion of the concave side and the central portion of the opposite convex side to thereby define stubby relatively inflexible lobes, the exterior surface of said lobes in their free forms being smoothly contoured throughout and continuously arcuate in shape whereby when fluid pressure is applied through said port the corner lobes of said sealing ring will provide an effective seal against leakage of the fluid between said piston and said cylinder.

5. A hydraulically operated expandible assembly comprising a cylinder member, a piston member mounted within said cylinder member and cooperatively defining therewith a pressure chamber, said members being movable relative to each other, said piston and said cylinder cooperatively defining a ring-receiving annular groove at the outer and inner periphery of said piston and cylinder respectively, one of said members defining the bottom of said groove and the other defining at least one side of said groove, said groove opening into said pressure chamber, one of said members having a port connected with said pressure chamber for introducing fluid pressure therewithin, one of said members having a substantially flat annular surface extending along periphery of and substantially normal to the axis of said piston, and constituting one side of said groove and a sealing ring disposed within said groove and being generally rectangular in cross-sectional configuration and having a pair of slightly concave radially spaced sides smoothly contoured and arcuately concave throughout their entire surfaces and having a pair of axially spaced sides, one of said axially spaced sides of said sealing ring being convex and bearing against said substantially flat annular surface and the other of said sides being only slightly concave and facing toward said pressure chamber, the innermost portion of said concave side being disposed at the central portion of the side, the lobes formed at the corners of the concave side extending outwardly of the central portion of the concave side a distance which is a very minor portion of the distance between the central portion of the concave side and the central portion of the opposite convex side to thereby define stubby relatively inflexible lobes, said sealing ring being disposed between said port and said piston and having continuously arcuate and convexly shaped throughout corner portions whereby when fluid pressure is applied through said port to said concave side of said sealing ring, said ring will provide an effective seal against leakage of the fluid past said member.

References Cited in the file of this patent

UNITED STATES PATENTS

| | | |
|---|---|---|
| 2,419,401 | Hinds | Apr. 22, 1947 |
| 2,700,561 | Svenson | Jan. 25, 1955 |
| 2,742,107 | DuBois | Apr. 17, 1956 |
| 2,791,295 | Kershner | May 7, 1957 |
| 2,841,429 | McCuiston | July 1, 1958 |
| 2,873,132 | Tanner | Feb. 10, 1959 |
| 2,874,807 | Hahn | Feb. 24, 1959 |

FOREIGN PATENTS

| | | |
|---|---|---|
| 547,066 | Great Britain | Jan. 7, 1942 |